US009075692B2

(12) United States Patent
Yu et al.

(10) Patent No.: US 9,075,692 B2
(45) Date of Patent: Jul. 7, 2015

(54) METHOD, DEVICE AND SYSTEM FOR ACTIVATING ON-LINE PATCH

(75) Inventors: Jiaqiang Yu, Shenzhen (CN); Wei Zheng, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 14 days.

(21) Appl. No.: 13/336,227

(22) Filed: Dec. 23, 2011

(65) Prior Publication Data

US 2012/0102476 A1    Apr. 26, 2012

Related U.S. Application Data

(63) Continuation of application No. PCT/CN2010/078271, filed on Oct. 30, 2010.

(30) Foreign Application Priority Data

Feb. 11, 2010  (CN) .......................... 2010 1 0113646

(51) Int. Cl.
    G06F 9/445    (2006.01)
(52) U.S. Cl.
    CPC ........................ G06F 8/67 (2013.01)
(58) Field of Classification Search
    CPC ........ G06F 8/65; G06F 8/665; G06F 11/3471
    USPC .......................... 717/110–113, 168; 714/2–24
    See application file for complete search history.

(56) References Cited

U.S. PATENT DOCUMENTS

| 5,596,733 | A  | * | 1/1997 | Worley et al. ................ 712/244 |
| 5,619,698 | A  | * | 4/1997 | Lillich et al. ................. 717/168 |
| 7,784,044 | B2 | * | 8/2010 | Buban et al. ................. 717/168 |
| 7,886,287 | B1 | * | 2/2011 | Davda .......................... 717/168 |

(Continued)

FOREIGN PATENT DOCUMENTS

| CN | 1475909 A | 2/2004 |
| CN | 1737773 A | 2/2006 |

(Continued)

OTHER PUBLICATIONS

First Chinese Office Action mailed Jun. 5, 2012, issued in related Chinese Application No. 201010113646.2, Huawei Technologies Co., Ltd. (7 pages).

(Continued)

*Primary Examiner* — Chat Do
*Assistant Examiner* — Sergio J Curbelo, III

(57) ABSTRACT

Embodiments of the present invention provide a method, a device and a system for activating an on-line patch. The method comprises: positioning an address of a patch function and an entry address of a to-be-patched function; writing, in a middle segment, a long-jump instruction for jumping to the patch function based on the address of the patch function and the entry address of the to-be-patched function, where the middle segment is a storage space, which is located before or after the entry position of the to-be-patched function and can at least store one long-jump instruction; and modifying an instruction at the entry position of the to-be-patched function to a short-jump instruction for jumping to the middle segment, so as to jump to the middle segment after the short jump instruction is executed, and then to jump to and execute the patch function through that instructions in the middle segment are executed.

10 Claims, 11 Drawing Sheets

(56) References Cited

U.S. PATENT DOCUMENTS

| | | | |
|---|---|---|---|
| 8,381,203 B1* | 2/2013 | Beylin et al. | 717/150 |
| 2004/0237068 A1* | 11/2004 | Ren | 717/110 |
| 2006/0015855 A1 | 1/2006 | Kumamoto | |

FOREIGN PATENT DOCUMENTS

| | | |
|---|---|---|
| CN | 101004681 A | 7/2007 |
| CN | 101004681 A | 7/2007 |
| CN | 101482834 A | 7/2009 |
| CN | 101482834 A | 7/2009 |
| WO | WO 03/009136 A1 | 1/2003 |
| WO | WO2011097901 A1 | 8/2011 |

OTHER PUBLICATIONS

SAM242; Article: "API hooking for hotpatchable operating systems"; The Code Project website (http://www.codeproject.com/Articles/27339/API-hooking-for-hotpatchable-orierating-systems); dated Jun. 28, 2008 (4 pgs.).

European Patent Office communication regarding the extended European search report, pursuant to Rule 62 EPC, the supplementary European search report (Art. 153(7) EPC) and the European search opinion related to Application No. 10845571.8-2211 / 2434394 for Huawei Tech Co., Ltd.; mailed Apr. 3, 2012 (9 pgs.).

International Search Report for International Application No. PCT/CN2010078271, mailed Jan. 27, 2011 Huawei Technologies Co., Ltd.

* cited by examiner

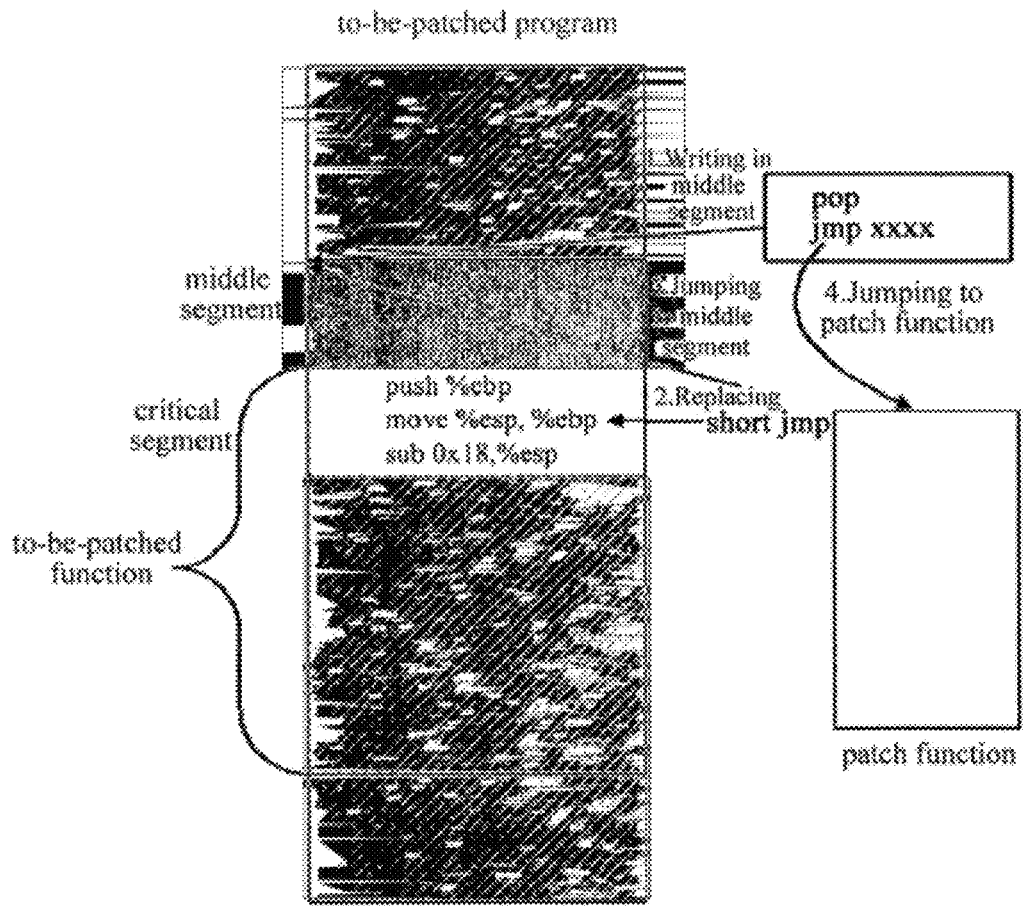

Fig. 7

| Adding a compiling option in a code of a compiler for compiling a to-be-patched program, the compiling option for controlling reservation of a middle segment and size of the middle segment | S2011 |

| Outputting an initial instruction with a number of bytes specified by the compiling option to reserve the middle segment, when the function of the to-be-patched program is compiled, according to the compiling option, to generation assembly instructions and before a function *prefix* is outputted | S2012 |

Fig. 8

```
                .text
        .globl test
                .type   test, @function
        test:
                pushl   %ebp
                movl    %esp, %ebp
                subl    $8, %esp
                movl    $.LC0, (%esp)
                call    vos_printf
                movl    $.LC1, (%esp)
                call    vos_printf
                movl    $.LC2, (%esp)
                call    vos_printf
                movl    $.LC3, (%esp)
                call    vos_printf
                movl    $.LC4, (%esp)
                call    vos_printf
                leave
                ret
                .size   test, .-test
                .section        .rodata
        .LC5:
                .string "\r\nthe value of b is [%#x]"
                .text
        .globl test1
                .type   test1, @function
```

Fig.12a

```
                    .text
        .byte   0x90
        .byte   0x90
        .byte   0x90
        .byte   0x90
        .byte   0x90
        .byte   0x90

.globl test
        .type   test, @function
test:
        pushl   %ebp
        movl    %esp, %ebp
        subl    $8, %esp
        movl    $.LC0, (%esp)
        call    vos_printf
        movl    $.LC1, (%esp)
        call    vos_printf
        movl    $.LC2, (%esp)
        call    vos_printf
        movl    $.LC3, (%esp)
        call    vos_printf
        movl    $.LC4, (%esp)
        call    vos_printf
        leave
        ret
        .size   test, .-test
        .section        .rodata
.LC5:
        .string "\r\nthe value of b is [%#x]"
        .text
        .byte   0x90
        .byte   0x90
        .byte   0x90
        .byte   0x90
        .byte   0x90
        .byte   0x90

.globl test1
        .type   test1, @function
test1:
        pushl   %ebp
        movl    %esp, %ebp
```

Fig.12b ited States Patent US 9,075,692 B2

METHOD, DEVICE AND SYSTEM FOR ACTIVATING ON-LINE PATCH

CROSS-REFERENCE TO RELATED APPLICATIONS

This application is a continuation of International Application No. PCT/CN2010/078271, filed Oct. 30, 2010, which claims priority to Chinese Patent Application No. 201010113646.2, filed Feb. 11, 2011, both of which are hereby incorporated by reference in their entireties.

FIELD OF THE INVENTION

The present invention relates to the technical field of computers, and more particularly, to a method, a device and a system for activating on-line patches.

BACKGROUND OF THE RELATED ART

Widely used in various types of software, on-line patches are patches that become effective during running of programs without restarting the programs. Referring to FIG. 1, the basic principle for activating an on-line patch is to replace the instruction at the entry of an original function (namely a to-be-patched function) with a jump instruction, and then to jump the program that invokes the original function to a patch function for execution through the replacing jump instruction. With the wide application of the Linux X86 system in the telecommunication field, it is also required for the application software in the Linux system to be patched on-line. However, due to the characteristics of the instructions of the X86 system and the scheduling mode of the Linux, the patch activating mode for simply modifying the instruction at the entry of a replaced function to a jump instruction becomes not entirely reliable, and cannot satisfy the requirements on the reliability of telecommunications software.

Referring to FIG. 2, in the Linux X86 system, unconditional jump instructions occupies five bytes, three instructions at the entry of the original function will be covered in most cases while an on-line patch is activated, and the segment of the five bytes occupied by the three instructions in the original function is referred to as a critical segment. If instructions at the entry of the original function are directly replaced with jump instructions while an on-line patch is activated, when there are plural threads in a progress, the circumstance may occur in which threads are switched precisely when a certain thread is executed to the critical segment (when executed to a first or a second instruction, for instance); if the on-line patch is activated at this time, abnormality will occur in the program after the thread is switched back, because the code of the critical segment of the original function has been covered by the new jump instruction.

Usually employed in the prior art is the Pannus patching technology, which specifically includes the following processes:

(1) suspending the progress of the original function by using the function ptrace;
(2) checking whether the values of the extended instruction pointers (EIP) of all threads of the original function are at the critical segment;
(3) writing a jump instruction at the entry of a patch function if none of the EIP values of the threads is at the critical segment, and restoring executing the progress;
(4) restoring executing the progress for a period of time if there is/are EIP value(s) of the thread(s) at the critical segment, and suspending the progress again for checkup; and
(5) returning failing of activating the patch if the patch can still not be activated after several rounds of checkups (10 rounds, for instance, as this can be self-defined).

Since the Pannus patching technology firstly suspends the progress of the original function and then checks whether the EIP values of all threads are in the critical segment, program abnormality occurring due to direct writing can be avoided to a certain extent.

However, the inventors found in the prior art during the process of implementing the present invention:

since only the EIP value of the current thread is checked prior to replacing the function, once there is a thread in the signal processing function, and the return address of the signal is in the critical segment, there will be program error when the thread returns after processing the signal processing function, because the critical segment has already been covered by the jump instruction. Accordingly, the security and reliability in activating patches can still not be guaranteed by such prior art technical solution.

SUMMARY OF THE INVENTION

Embodiments of the present invention is to provide a method and a system for activating software on-line patches, so as to enhance the security and reliability in activating on-line patches of application software.

Embodiments of the present invention are realized by the following technical solutions.

A method for activating an on-line patch comprises the following processes: positioning an address of a patch function and an entry address of a to-be-patched function; writing, in a middle segment, a long jump instruction for jumping to the patch function based on the address of the patch function and the entry address of the to-be-patched function, wherein the middle segment is a storage space, which is located before or after an entry position of the to-be-patched function and is capable of at least storing one long-jump instruction, and the entry address of the to-be-patched function represents the entry position of the to-be-patched function; and modifying an instruction at the entry position of the to-be-patched function to a short-jump instruction for jumping to the middle segment, so as to jump to the middle segment after the short-jump instruction is executed, and then to jump to and execute the patch function through that one or more instructions in the middle segment are executed, wherein the one or more instructions in the middle segment includes the long-jump instruction for jumping to the patch function.

A communication system comprises at least one CPU and a memory, the CPU having an operating system running thereon, the operating system having at least one application program running thereon, and the application program being associated with a patch management thread and at least one service thread, wherein: the memory is loaded with an application program including at least one to-be-patched function and a patch file including a patch function, wherein there is a storage space capable of at least storing one long-jump instruction before or after an entry position of the to-be-patched function;

the patch management thread is configured, in the running process of the application program, to position an address of the patch function and an entry address of the to-be-patched function, to write, in the storage space, a long-jump instruction for jumping to the patch function, and to modify an instruction at the entry position of the to-be-patched function to a short-jump instruction for jumping to the storage space, and the entry address of the to-be-patched function represents the entry position of the to-be-patched function; and the service thread is configured to execute to the short jump instruction at the entry position of the to-be-patched function to jump to the storage space, and to jump to and execute the patch function through that one or more instructions in the storage space are executed, wherein the one or more instructions in the middle segment includes the long-jump instruction for jumping to the patch function.

A patch managing device comprises:

an address positioning unit, configured to position, in the running process of a to-be-patched application program, an address of a patch function and an entry address of a to-be-patched function associated with the application program;

a long-jump instructing unit, configured to write, in a middle segment, a long-jump instruction for jumping to the patch function based on the address of the patch function and the entry address of the to-be-patched function, wherein the middle segment is a storage space, which is located before or after an entry position of the to-be-patched function and is capable of at least storing one long-jump instruction, and the entry address of the to-be-patched function represents the entry position of the to-be-patched function; and a short-jump instructing unit, configured to modify an instruction at the entry position of the to-be-patched function to a short-jump instruction for jumping to the middle segment, so as to jump to the middle segment after the short-jump instruction is executed, and then to jump to and execute the patch function through that one or more instructions in the middle segment are executed, wherein the one or more instructions in the middle segment includes the long-jump instruction for jumping to the patch function.

And a communication system comprises at least one processor core and a memory, the processor core having an operating system running thereon, the operating system having at least one application program running thereon, and the application program being associated with a patch management thread and at least one service thread, wherein the memory is loaded with an application program including at least one to-be-patched function and a patch file including a patch function, wherein there is a storage space capable of at least storing one long-jump instruction before or after an entry position of the to-be-patched function;

the patch management thread is configured, in the running process of the application program, to position an address of the patch function and an entry address of the to-be-patched function, to write, in the storage space, a long jump instruction for jumping to the patch function, and to modify an instruction at the entry position of the to-be-patched function to a short-jump instruction for jumping to the storage space, and the entry address of the to-be-patched function represents the entry position of the to-be-patched function; and the service thread is configured to execute the short jump instruction to the entry position of the to-be-patched function, to jump to the storage space, and to jump to and to execute the patch function through that one or more instructions in the storage space are executed, wherein the one or more instructions in the middle segment includes the long-jump instruction for jumping to the patch function.

Seen as such, the embodiments of the present invention write, in the storage space, the long-jump instruction for jumping to the patch function before or after the function of the to-be-patched program, modify the instruction at the entry position of the to-be-patched function to a short-jump instruction for jumping to the storage space, and enable the patch to become effect by jumping through that the instructions in the storage space are executed while the patch is activated. Since the operation of modifying the instruction at the entry position of the function is an atomic operation, i.e. the lengths of the instruction prior to the modification and the modified instruction are identical, it suffices to modify only one instruction, and there is no need to cover other instructions in the critical segment, thereby avoiding the existing hidden troubles about the security and reliability in activating patches in the prior art under the multi-thread scheduling mechanism caused by the fact that, since the system makes use of a complicated set of instructions, the jump instruction will cover plural instructions at the entry of the function when an on-line patch is activated for application software. Accordingly, the method according to the embodiments of the present invention can ensure the security and reliability in activating on-line patches of the software under the multi-thread condition, and does not interrupt the service.

BRIEF DESCRIPTION OF THE DRAWINGS

To make more clear the explanation to the technical solutions in the embodiments of the present invention or in the prior art, the accompanying drawings to be used in the description of the embodiments or of the prior art will be briefly illustrated below. Apparently, the accompanying drawings illustrated below are just directed to some embodiments of the present invention, and it is possible for the persons skilled in the art to deduce other drawings from these accompanying drawings without paying any creative effort.

FIG. 7 is a schematic diagram illustrating the principle of a method for activating a software on-line patch according to the embodiments of the present invention;

FIG. 8 is a schematic diagram illustrating the flow of a method for reserving a middle segment in S201 of FIG. 6;

FIG. 12a and FIG. 12b are a schematic diagram illustrating comparison of the effects prior to and after inserting the middle segment in the assembly file according to the embodiments of the present invention;

DETAILED DESCRIPTION OF THE INVENTION

To make more clear the objectives, technical solutions and advantages of the embodiments of the present invention, the technical solutions according to the embodiments of the present invention will be clearly and completely described below with reference to the accompanying drawings. Apparently, the embodiments as described below are merely partial, rather than entire, embodiments of the present invention. On the basis of the embodiments of the present invention, all other embodiments obtained by the persons skilled in the art without paying any creative effort shall all fall within the protection scope of the present invention.

Figure 1:
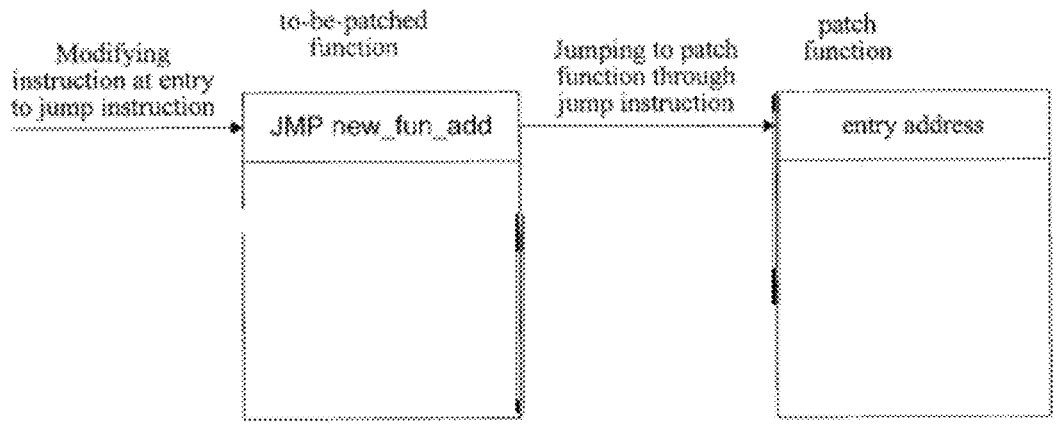
FIG. 1 is a schematic diagram illustrating the principle for activating patches in the prior art.
Figure 2:
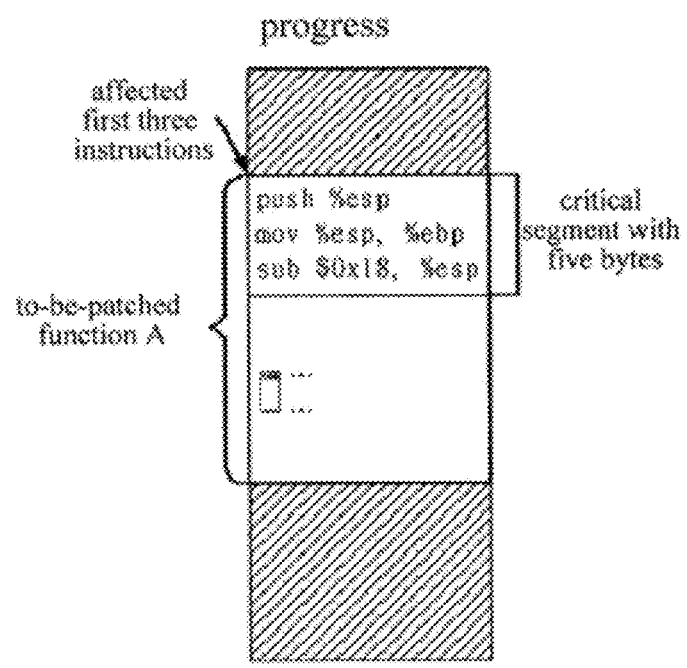
FIG. 2 is a schematic diagram illustrating the critical segment in the prior art.
Figure 3A:
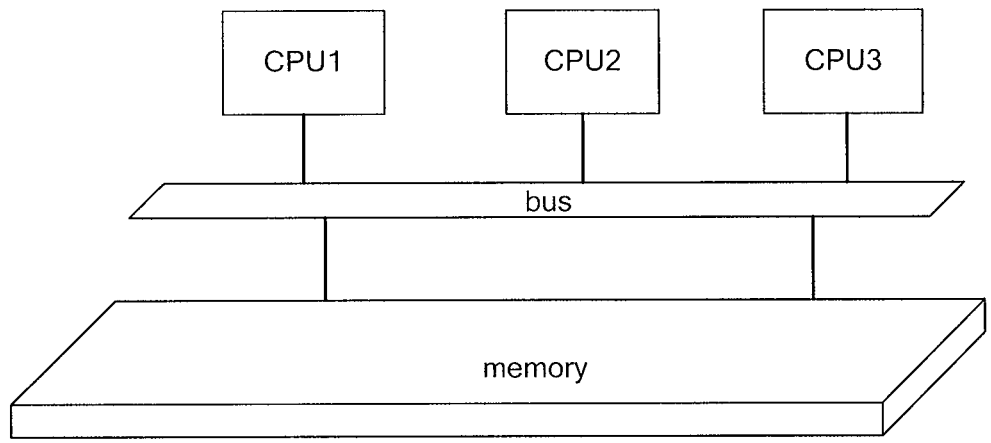
FIG. 3a is a schematic diagram illustrating the structure of the communication system according to the embodiments of the present invention.
Figure 3B:
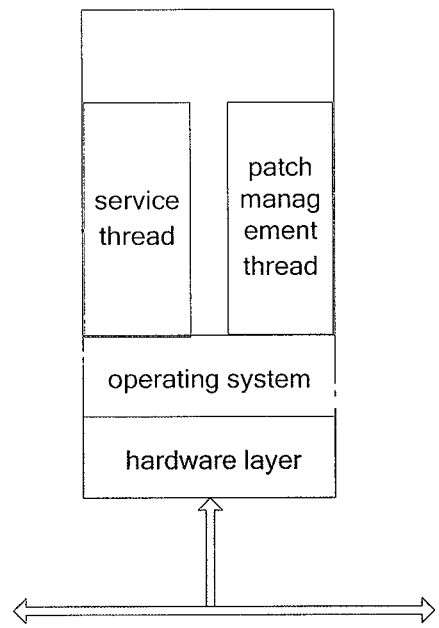
FIG. 3b is a schematic diagram illustrating local logic of the communication system according to the embodiments of the present invention.

Referring to FIGS. 3a and 3b, which are schematic diagrams illustrating the structure of the communication system according to the embodiments of the present invention, the communication system according to the embodiments of the present invention supports activation of software on-line patches under the multi-thread environment. As should be explained, FIG. 3a includes three CPUs (CPU1, CPU2, CPU3) that access memory 30 via bus 20. As should be understood, the communication system according to the embodiments of the present invention can include one CPU, namely a communication system with a single CPU, and can also include a plurality of CPUs, namely a multi-CPU (multi-core) communication system. That is to say, the communication system according to the embodiments of the present invention includes at least one CPU and a memory, the CPU has an operating system running thereon, the operating system has at least one application program (also referred to as "software") running thereon, and the application program is associated with a patch management thread and at least one service thread. As should be explained, the patch management thread can be either a thread inside the to-be-patched program, or a thread independent of all to-be-patched programs.

The memory is loaded with an application program including at least one to-be-patched function and a patch file including a patch function, wherein a storage space capable of at least storing one long-jump instruction is located before or after the entry position of the to-be-patched function. The storage space in this context can for instance be within 128 bytes before or after the entry position of the function (also referred to as "initial position of the function"), and can specifically be within six bytes before the entry position of the function.

The patch management thread is configured, in the running process of the application program, to position the address of the patch function and the entry address of the to-be-patched function, to write, in the storage space, a long-jump instruction for jumping to the patch function, and to modify the instruction at the entry position of the to-be-patched function to a short jump instruction for jumping to the storage space. The service thread is configured to execute the short-jump instruction at the entry position of the to-be-patched function, jumping to the storage space, and to jump to and execute the patch function through that the instructions in the storage space are executed, thereby making effective the on-line patch.

To facilitate the subsequent description, the original instruction at the entry position of the to-be-patched function modified to the short-jump instruction is referred to as instruction A in this context.

In one implementation mode, the patch management thread is specifically configured, in the running process of the application program, to position the address of the patch function and the entry address of the to-be-patched function, to write, in the storage space, a long-jump instruction for jumping to the patch function, or to write a reverse operating instruction to the operating instruction located before instruction A and a long jump instruction for jumping to the patch function, and to modify instruction A at the entry position of the to-be-patched function and with a length greater than or equal to two bytes to a short jump instruction for jumping to the storage space.

Specifically, if instruction A is a first instruction at the entry position of the to-be-patched function and has a length greater than or equal to two bytes, the long-jump instruction for jumping to the patch function is written in the storage space; alternatively, if instruction A is a non-first instruction at the entry position of the to-be-patched function and has a length greater than or equal to two bytes, the reverse operating instruction to the operating instruction located before instruction A and the long-jump instruction for jumping to the patch function are written in the storage space.

In one specific implementation mode, the patch management thread is specifically configured, in the running process of the application program, to position the address of the patch function and the entry address of the to-be-patched function, to write, in the storage space, a Pop from Stack instruction pop and a long-jump instruction for jumping to the patch function, and to modify the instruction move after the Push onto Stack instruction push at the entry position of the to-be-patched function to a short-jump instruction for jumping to the storage space.

In one embodiment of the present invention, the communication system according to the embodiments of the present invention further comprises a compiler (not shown in the drawings) configured to reserve, while a to-be-patched program is compiled, a storage space capable of at least storing one long-jump instruction before or after the entry position of each function of the to-be-patched program. The storage space capable of at least storing one long-jump instruction and located before or after the entry position of the to-be-patched function in this context can be referred to as a middle segment.

In one specific implementation mode, the compiler is specifically configured to output an initial instruction with a number of bytes specified by a compiling option to reserve the storage space (middle segment) capable of at least storing one long-jump instruction, when a function associated with the to-be-patched program is compiled, according to the compiling option that controls reservation of the storage space and size of the storage space, to generate assembly instructions and before the assembly function name of the function is outputted.

In another specific implementation mode, the compiler is specifically configured to search for a keyword string representing the function in an assembly file, after the source file of the to-be-patched program is compiled to generate the assembly file; insert the initial instruction with a specified number of bytes before or after the entry position of the function indicted by the searched keyword string representing the function to reserve the storage space (middle segment) capable of at least storing one long-jump instruction; and recompile the assembly file inserted with the aforementioned initial instruction to generate a new assembly file, compile the new assembly file to generate a target file, and link a plurality of target files to generate an executable file of the to-be-patched program, wherein the specified number of bytes represents the size of the storage space (middle segment).

Under another embodiment of the present invention, in the communication system according to the embodiments of the present invention a compiling program is further run on the operating system for reserving, while the to-be-patched program is compiled, a storage space capable of at least storing one long-jump instruction before or after the entry position of each function of the to-be-patched program. Refer to the foregoing contents about the compiler for the specific operating process of the compiling program, while no repetition will be made here.

As should be explained, the patch management thread and the at least one service thread can belong to the same progress, i.e. the patching operation can be completed in a single progress; thus, all threads in the single progress can share accessing the user state storage segment (namely the progress space); within the single progress, the patch management thread writes the long-jump instruction in the storage space (middle segment) before or after the entry position of the to-be-patched function and capable of storing at least one long-jump instruction, and modifies the instruction at the entry position of the to-be-patched function to a short-jump instruction for jumping to the storage space.

Under another implementation, the patch management thread and the at least one service thread in this context can also belong to different progresses; for instance, the patch management thread belongs to progress A, and the at least one service thread belongs to progress B.

As should be explained, a task is the mapping of running of a code; as seen from the perspective of the system, a task is the smallest running unit that competes for system resources. The task can use or wait for system resources such as CPU, I/O device and memory space, is independent of other tasks, and runs concurrently therewith. Under the Linux and Win32 systems, the task corresponds to the concept of a thread.

As should be understood, the communication system according to the embodiments of the present invention can specifically be the Linux X86 system, or the Linux X64 system, and can also be a quasi-Unix system such as Solaris or aix, etc. For example, in case of the Linux X86 system, the communication system includes at least one CPU with the X86 architecture, wherein a Linux operating system is run on the CPU, at least one application program (also referred to as "software") is run on the Linux operating system, and the application program is associated with a patch management thread and at least one service thread (whose specific functions are identical with those discussed above, so that they are not repetitively described here).

Seen as such, the embodiments of the present invention write, in the storage space, the long-jump instruction for jumping to the patch function before or after the entry position of the function of the to-be-patched program, modify the instruction at the entry position of the to-be-patched function to a short-jump instruction for jumping to the storage space (middle segment), and enable the patch to become effective by jumping through that the instructions in the middle segment are executed while the patch is activated. Since the operation of modifying the instruction at the entry position of the function is an atomic operation, i.e. the lengths of the instruction prior to the modification and the modified instruction are identical, it suffices to modify only one instruction, and there is no need to cover other instructions in the critical segment, thereby avoiding the existing hidden troubles about the security and reliability in activating patches in the prior art under the multi-thread scheduling mechanism caused by the fact that, since the system makes use of a complicated set of instructions, the jump instruction will cover a plurality of instructions at the entry of the function when an on-line patch is activated for application software (i.e. a circumstance occurs in which threads are switched precisely when a certain thread is executed to the critical segment (namely the instruction segment at the entry of the to-be-patched function), if the on-line patch is activated at this time, abnormality will occur for the program after the thread is switched back, because the critical segment of the original function has been covered by the new jump instruction; or, an error will occur for the program when a thread returns after processing the signal processing function (the return address of the signal is in the critical segment), because the critical segment has already been covered by the jump instruction). Accordingly, the method according to the embodiments of the present invention can ensure the security and reliability in activating on-line patches of the software under the multi-thread condition, and does not interrupt the service.

Figure 4:
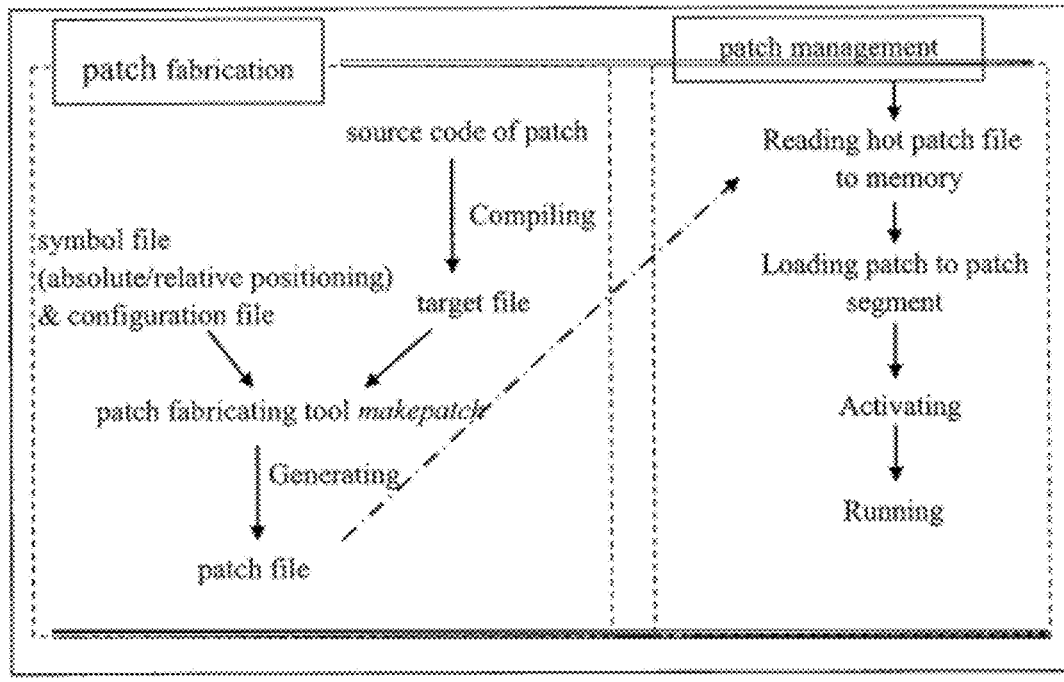
FIG. 4 is a schematic diagram illustrating the fabrication and management of an on-line patch according to the embodiments of the present invention.

Refer to FIG. 4, which is a schematic diagram illustrating the fabrication and management of an on-line patch according to the embodiments of the present invention. As shown in FIG. 4, the patch fabricating process is as follows: after the on-line patch is fabricated at the background using a patching tool, the source code of the patch is compiled into a target file, and the symbol file (in an absolute or relative positioning form) of a to-be-patched program and the target file of a patch program are fabricated by a patch fabricating tool to generate an on-line patch file.

The patch managing process is as follows: the aforementioned on-line patch file (also referred to as "hot patch file") is read into a memory, and the patch is loaded into a patch segment and activated to become effective.

The embodiments of the present invention will be described in detail below with reference to the accompanying drawings.

Figure 5:
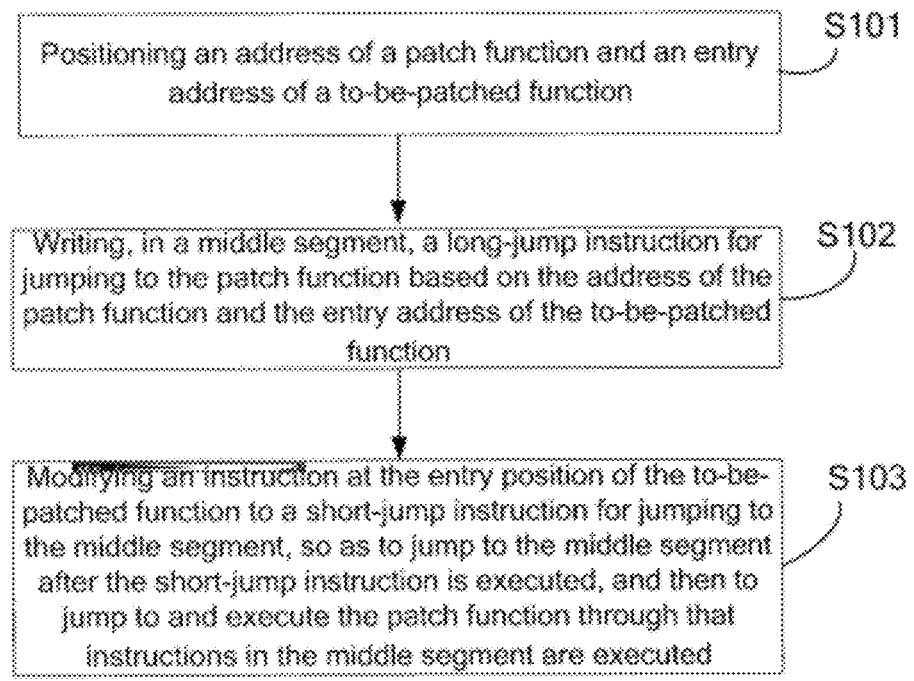
FIG. 5 is a schematic diagram illustrating the flow of a method for activating a software on-line patch according to the embodiments of the present invention.

Referring to FIG. 5, which is a schematic diagram illustrating the flow of a method for activating an on-line patch according to the embodiments of the present invention, the method is applicable to a communication system comprising at least one CPU and a memory, wherein the CPU has an operating system running thereon, the operating system has at least one application program (also referred to as "software") running thereon, and the application program is associated with a patch management thread and at least one service thread. Specifically, the execution subject of the method can be the patch management thread associated with the to-be-patched program, wherein the method may include the following processes:

S101: positioning an address of a patch function and an entry address of a to-be-patched function.

Specifically, the address of the patch function and the entry address of the to-be-patched function are positioned in the running process of the to-be-patched program, wherein, specifically, patch function address information is read from a data array in the memory.

As should be explained, as shown in FIG. 4, if the patch function address information in the patch file is an absolute address, the patch function address information contained in the patch file is directly stored in the assigned data array in the memory during the process of loading the patch.

If the patch function address information in the patch file is a relative address (non-absolute address), the absolute address of the patch function is obtained by calculating according to the relative address of the patch function, and the calculation result is stored in the assigned data array in the memory during the process of loading the patch.

S102: writing, in a middle segment, a long jump instruction for jumping to the patch function based on the address of the patch function and the entry address of the to-be-patched function, wherein the middle segment is a storage space, which is located before or after the entry position of the to-be-patched function and is capable of at least storing one long-jump instruction.

The storage space (middle segment) in this context can for instance be within 128 bytes before or after the entry position of the to-be-patched function (also referred to as "initial position of the function"), and can specifically be within six bytes before the entry position of the function.

S103: modifying an instruction at the entry position of the to-be-patched function to a short jump instruction for jumping to the middle segment, so as to jump to the middle segment after the short-jump instruction is executed, and then to jump to and execute the patch function through that instructions in the middle segment are executed, thereby making effective the on-line patch.

To facilitate the subsequent description, the original instruction at the entry position of the to-be-patched function modified to the short-jump instruction is referred to as instruction A.

Under one mode of implementation, instruction A is the first instruction at the entry position of the to-be-patched function and has a length greater than or equal to two bytes.

Under another implementation mode, instruction A is the non-first instruction at the entry position of the to-be-patched function and has a length greater than or equal to two bytes, in which case the process of writing a long-jump instruction for jumping to the patch function in a middle segment in S102 can specifically be: writing, in the middle segment, a reverse operating instruction to the operating instruction located before instruction A and a long-jump instruction for jumping to the patch function.

In one specific embodiment of the present invention, instruction A is an instruction (namely the second instruction) after the Push onto Stack instruction push at the entry position of the to-be-patched function, and the reverse operating instruction to the operating instruction push located before instruction A is a Pop from Stack instruction pop. Correspondingly, the Pop from Stack instruction pop and the long-jump instruction for jumping to the patch function are written in the middle segment, and the instruction (namely the second instruction) after the Push onto Stack instruction push at the entry position of the to-be-patched function is modified to a short-jump instruction for jumping to the middle segment.

The middle segment can be reserved before or after the entry position of each function of a to-be-patched program while the program is compiled. Under one implementation mode, the method for reserving the middle segment before or after the entry positions of all to-be-patched functions specifically includes the following processes:

outputting an initial instruction with a number of bytes specified by a compiling option to reserve the middle segment, when the function of the to-be-patched program is compiled, according to the compiling option that controls the reservation of the middle segment and the size of the middle segment, to generate assembly instructions, and before the assembly function name of the function is outputted. As should be understood, the initial instruction in this context is configured to occupy the storage space in advance; correspondingly, writing, in the middle segment, the long-jump instruction for jumping to the patch function is to modify the original initial instruction in the storage space to the long-jump instruction (and the reverse operating instruction).

Under another implementation mode, the method for reserving the middle segment before or after the entry positions of all to-be-patched functions specifically includes the following processes:

searching for a keyword string representing the function in an assembly file, after a source file of the to-be-patched program is compiled to generate the assembly file;

inserting the initial instruction with a specified number of bytes before or after the entry position of the function indicted by the searched keyword string representing the function to reserve the middle segment, wherein the specified number of bytes represents the size of the middle segment; and recompiling the assembly file inserted with the initial instruction to generate a new assembly file, compiling the new assembly file to generate a target file, and linking a plurality of target files to generate an executable file of the to-be-patched program.

Seen as such, the embodiments of the present invention write, in the storage space, the long-jump instruction for jumping to the patch function before or after the entry position of the function of the to-be-patched program, modify the instruction at the entry position of the to-be-patched function to a short-jump instruction for jumping to the storage space (middle segment), and enable the patch to become effective by jumping through that the instructions in the middle segment are executed while the patch is activated. Since the operation of modifying the instruction at the entry position of the function is an atomic operation, i.e. the lengths of the instruction prior to the modification and the modified instruction are identical, it suffices to modify only one instruction, and there is no need to cover other instructions in the critical segment, thereby avoiding the existing hidden troubles about the security and reliability in activating patches in the prior art under the multi-thread scheduling mechanism caused by the fact that, since the system makes use of a complicated set of instructions, the jump instruction will cover a plurality of instructions at the entry of the function when an on-line patch is activated for application software (i.e. a circumstance occurs in which threads are switched precisely when a certain thread is executed to the critical segment (namely the instruction segment at the entry of the to-be-patched function), if the on-line patch is activated at this time, abnormality will occur for the program after the thread is switched back, because the critical segment of the original function has been covered by the new jump instruction; or, an error will occur for the program when a thread returns after processing the signal processing function (the return address of the signal is in the critical segment), because the critical segment has already been covered by the jump instruction). Accordingly, the method according to the embodiments of the present invention can ensure the security and reliability in activating on-line patches of the software under the multi-thread condition, and does not interrupt the service.

Figure 6:
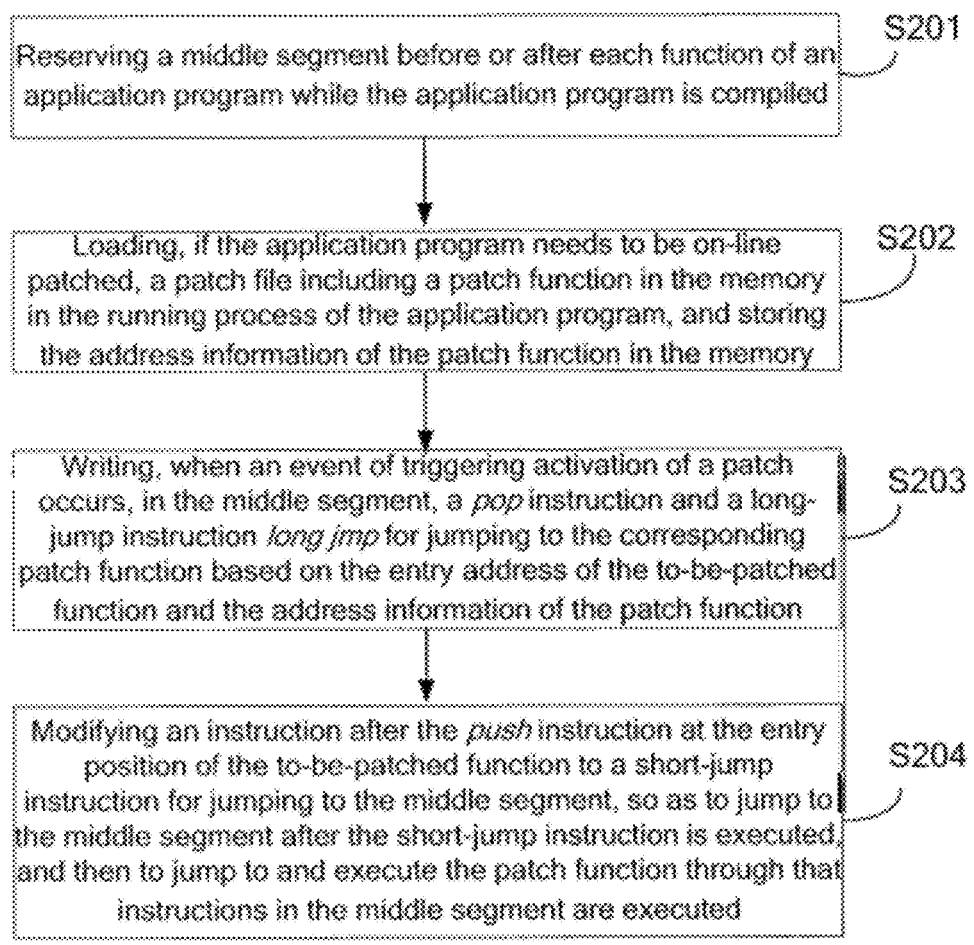
FIG. 6 is a schematic diagram illustrating the flow of another method for activating a software on-line patch according to the embodiments of the present invention.

Referring to FIG. 6, which is a schematic diagram illustrating the flow of another method for activating an on-line patch according to the embodiments of the present invention, the method is applicable to a communication system comprising at least one CPU and a memory, wherein the CPU has an operating system running thereon, the operating system has at least one application program (also referred to as "software") running thereon, and the application program is associated with a patch management thread and at least one service thread. Specifically, the execution subject of the method can be the patch management thread associated with the to-be-patched program, wherein the method may include the following processes:

S201: reserving, while an application program is compiled, a middle segment before or after the entry position of each function of the application program.

Preferably, the middle segment is reserved before the entry position of the function, so as to ensure jumping to the middle segment by using a short-jump instruction short jmp. As shown in FIG. 7, in a specific embodiment of the present invention, the middle segment is located before the entry position of the to-be-patched function, and occupies six bytes (relative to the jump instruction). If an absolute jump instruction is configured or if it is applied in a system of x86-64 bytes, the address space of the reserved middle segment should be correspondingly enlarged.

S202: loading, if the application program needs to be on-line patched, a patch file including a patch function in the memory in the running process of the application program, and storing the address information of the patch function in the memory.

Specifically, the address information of the patch function included in the patch file is stored in a data array in the memory or calculated and then stored in the data array in the memory.

S203: writing, when an event of triggering activation of a patch occurs, in the middle segment a reverse operating instruction pop (namely a Pop from Stack instruction that occupies 1 byte) to the instruction push at the entry position of the to-be-patched function and a long-jump instruction long jmp for jumping to the corresponding patch function based on the entry address of the to-be-patched function and the address information of the patch function read from the memory.

As shown in FIG. 7, in the specific embodiment of the present invention, the long-jump instruction long jmp can be a relative jump instruction with 5 bytes, or an absolute jump instruction occupying more bytes.

As shown in FIG. 7, in the specific embodiment of the present invention, the instructions written in the middle segment are one pop instruction and one long jmp instruction. Under another implementation mode, the instructions written in the middle segment may as well be one push instruction, two pop instructions and one long jmp instruction. By the same token, under still another implementation mode of, the instructions written in the middle segment may as well be two push instructions, three pop instructions and one long jmp instruction. As should be understood, the number of pop instructions included in the middle segment is equal to a sum of the number of push instructions included in the critical segment and the number of push instructions included in the middle segment; in other words, the total number of Push onto Stack instructions is equal to the total number of Pop from Stack instructions.

S204: modifying an instruction after the push instruction (namely a Push onto Stack instruction) at the entry position of the to-be-patched function to a short-jump instruction (which occupies two bytes) for jumping to the middle segment, so as to jump to the middle segment after the short-jump instruction is executed, and then to jump to and execute the patch function through instructions in the middle segment are executed, thereby making the on-line patch activated/effective.

As should be explained, under still another implementation mode, if the original instruction at the entry position of the to-be-patched function to be modified to the short jump instruction is the first instruction at the entry position of the to-be-patched function and has a length greater than or equal to two bytes, it suffices in S203 to write the long-jump instruction long jmp for jumping to the patch function in the middle segment.

As shown in FIG. 7, in the specific embodiment of the present invention, the move instruction after the push instruction at the entry position of the to-be-patched function is modified to a short-jump instruction short jmp for jumping to the middle segment, and the move instruction prior to the modification and the short jmp instruction after the modification have the same lengths of two bytes. The move instruction is the second instruction at the entry position of the to-be-patched function. Since the operation of modifying the second instruction at the entry position of the to-be-patched function is an atomic operation, the method according to the embodiments of the present invention can ensure the security and reliability in making effect the on-line patch.

Seen as such, the embodiments of the present invention reserve the middle segment before or after the entry position of the function of the to-be-patched program, write the long-jump instruction for jumping to the patch function in the reserved middle segment, modify the instruction, namely the second instruction, after the push instruction at the entry position of the to-be-patched function to a short-jump instruction for jumping to the middle segment, and enable the patch to become effective by jumping through the middle segment while the patch is activated. Since the operation of modifying the second instruction at the entry position of the function is an atomic operation, i.e. the lengths of the instruction prior to the modification and the modified instruction are identical, it suffices to modify only one instruction, and there is no need to cover other instructions in the critical segment, thereby avoiding the existing hidden troubles about the security and reliability in activating patches in the prior art under the multi-thread scheduling mechanism caused by the fact that, since the system makes use of a complicated set of instructions, the jump instruction will cover a plurality of instructions at the entry of the function when an on-line patch is activated for application software (i.e. a circumstance occurs in which threads are switched precisely when a certain thread is executed to the critical segment, if the on-line patch is activated at this time, abnormality will occur for the program after the thread is switched back, because the critical segment of the original function has been covered by the new jump instruction; or, an error will occur for the program when a thread returns after processing the signal processing function (the return address of the signal is in the critical segment), because the critical segment has already been covered by the jump instruction). Accordingly, the method according to the embodiments of the present invention can ensure the security and reliability in activating on-line patches of the software under the multi-thread condition, and does not interrupt the service.

Referring to FIG. 8, which is a schematic diagram illustrating the flow of a method for reserving a middle segment according to the embodiments of the present invention, the method supports reserving a middle segment before or after the entry position of each function of a to-be-patched program while the program is compiled, and the method is applied in a system that uses an open source compiler gcc. The operation of reserving the middle segment according to the embodiment of the present invention can be achieved by modifying the code of the compiler, and specifically includes the following processes:

S2011—adding a compiling option in the code of a compiler for compiling a to-be-patched program, the compiling option for controlling reservation of the middle segment and size of the middle segment.

S2012 outputting an initial instruction with a number of bytes specified by a compiling option to reserve the middle segment, when the function of the to-be-patched program is compiled, according to the compiling option, to generate assembly instructions, and before an assembly function name of the function is outputted.

The initial instruction in this context can for instance be an all-null blank instruction or an all-zero instruction.

Correspondingly, the process of writing in the middle segment the pop instruction and the long-jump instruction long jmp in S203 of FIG. 6 is specifically to modify the initial instruction to the pop instruction and the long-jump instruction long jmp.

As should be explained, in the general version of the system using the open source compiler gcc, it is possible to add the operation of outputting the initial instruction with a number of bytes specified by the compiling option to the assembly file, before outputting a function prefix from assemble_start_function in a Varasm.c file to the code of the assembly file.

Figure 9:
FIG. 9 is a schematic diagram illustrating the principle of a traditional process for compiling an application program.

Referring to FIG. 9, which is a schematic diagram illustrating the principle of a traditional process for compiling an application program, the traditional compiling process includes compiling a source file (.c file) by a compiler to a target file (.o file, namely a binary file), and linking a plurality of target files into an executable file.

Figure 10:
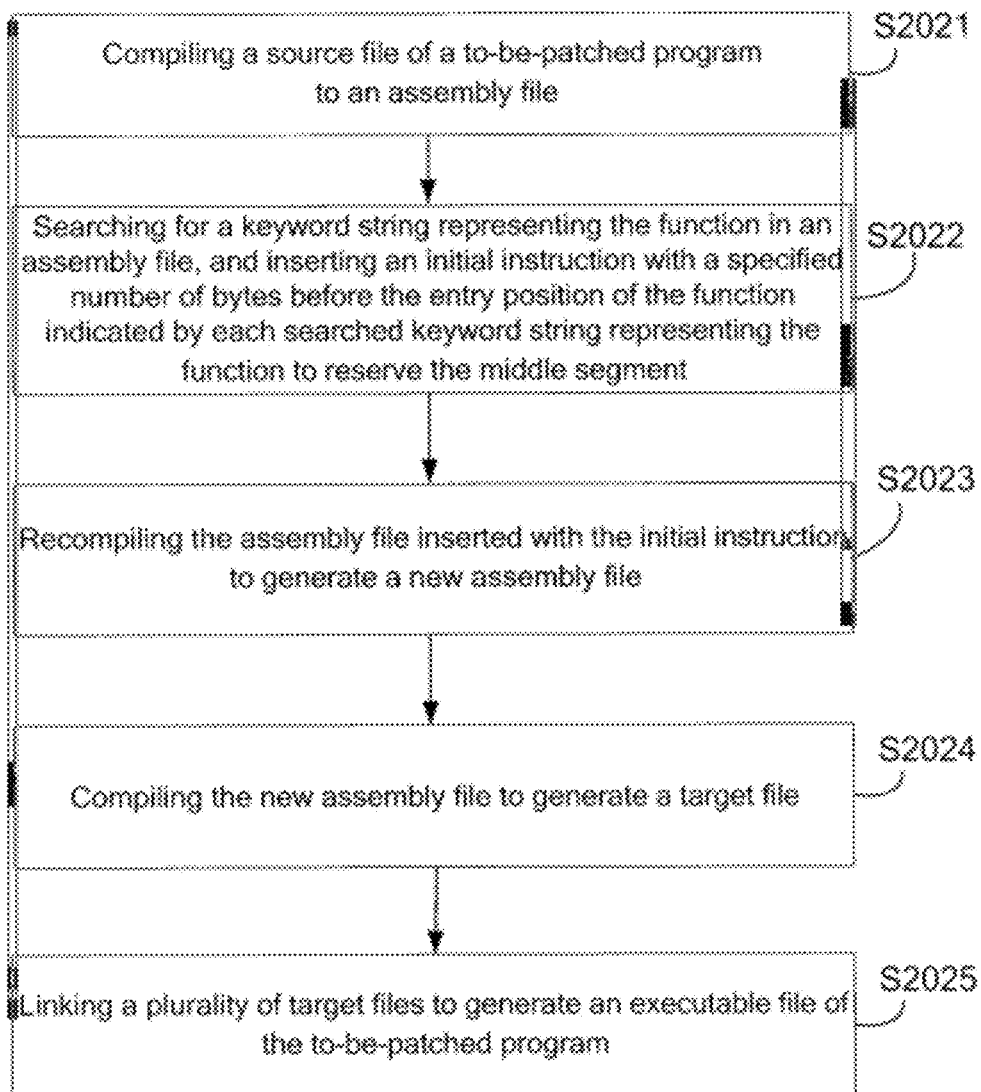
FIG. 10 is a schematic diagram illustrating the flow of another method for reserving a middle segment in S201 of FIG. 6.

Referring to FIG. 10, which is a schematic diagram illustrating the flow of another method for reserving a middle segment according to the embodiments of the present invention, the method supports reserving the middle segment before or after the entry positions of all functions while a to-be-patched program is compiled, and the operation of reserving the middle segment according to the embodiment of the present invention can be achieved by modifying an assembly file generated during the compiling process. The method is not only applicable to the application program compiled by using an open source compiler gcc, but is also applicable to application programs compiled by other compilers not using the open source. The method is specifically presented as reserving the middle segment before the entry position of the function, and includes the following processes:

S2021: compiling a source file (.c file) of a to-be-patched program to an assembly file (.s file); since this pertains to the prior art, it is not repetitively described here.

S2022: reserving the middle segment before entry positions of all functions: searching for a keyword string representing the function in the assembly file as generated by compiling, and inserting an initial instruction with a specified number of bytes before the entry position of the function indicated by each searched keyword string representing the function to reserve the middle segment.

The initial instruction in this context can for instance be an all-null blank instruction or an all-zero instruction. The specified number of bytes represents the size of the reserved middle segment in this context.

S2023: recompiling the assembly file inserted with the initial instruction to generate a new assembly file; since this pertains to the prior art, it is not repetitively described here.

S2024: compiling the new assembly file to generate a target file; since this pertains to the prior art, it is not repetitively described here.

S2025: linking a plurality of target files to generate the executable file of the to-be-patched program; since this pertains to the prior art, it is not repetitively described here. As should be explained, the executable file as generated in this context is precisely the to-be-patched program in which the middle segment has already been reserved before the entry positions of all functions.

Figure 11:
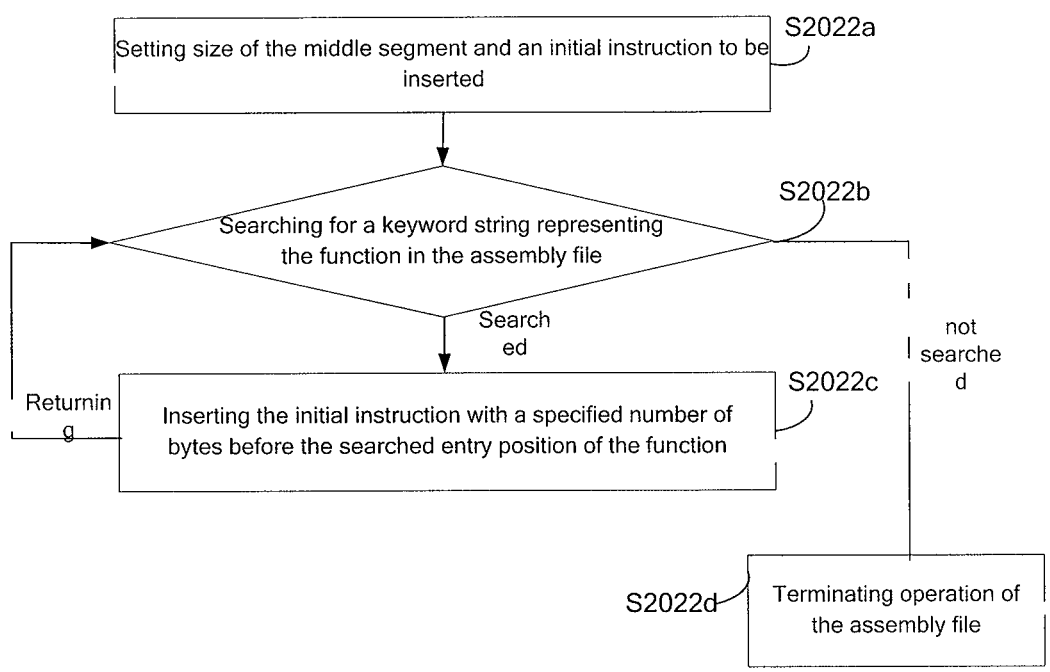
FIG. 11 is a schematic diagram illustrating the specific flow of S2022 in FIG. 10.

As shown in FIG. 11, the process of reserving the middle segment before the entry position of the function in S2022 specifically includes the following processes:

S2022a: setting size of the middle segment and an initial instruction to be inserted; wherein the size of the middle segment is represented by the specified number of bytes.

As shown in FIGS. 12a and 12b, in one specific embodiment of the present invention, the initial instruction is specifically an all-zero instruction 0×90. The specified number of bytes is specifically 6 bytes. FIG. 12a is a schematic diagram illustrating the operation before inserting the all-zero instruction with 6 bytes before the searched entry position of the function, and FIG. 12b is a schematic diagram illustrating the operation after inserting the all-zero instruction with 6 bytes before the searched entry position of the function.

S2022b: searching for a keyword string representing the function in the assembly file; proceeding to S2022c if the keyword string is searched to indicate that the entry position of the function is searched; if not, proceeding to S2022d to terminate the operation of the assembly file.

As shown in FIG. 12a and FIG. 12b, in one specific embodiment of the present invention, the keyword string representing the function in this context is @function; as shown in FIG. 12a and FIG. 12b, two instances of @function are searched.

S2022c: inserting an initial instruction with a specified number of bytes before the searched entry position of the function, returning to execute S2022b, and continuing to search for the next keyword string representing the function until all functions have been searched and the initial instruction with a specified number of bytes has been inserted in the entry position of each function. The effect of inserting the middle segment in the assembly file is as shown in FIG. 12a and FIG. 12b, which compares schematic diagrams illustrating the operations before and after inserting the all-zero instruction with 6 bytes before the searched entry position of the function.

Figure 13:
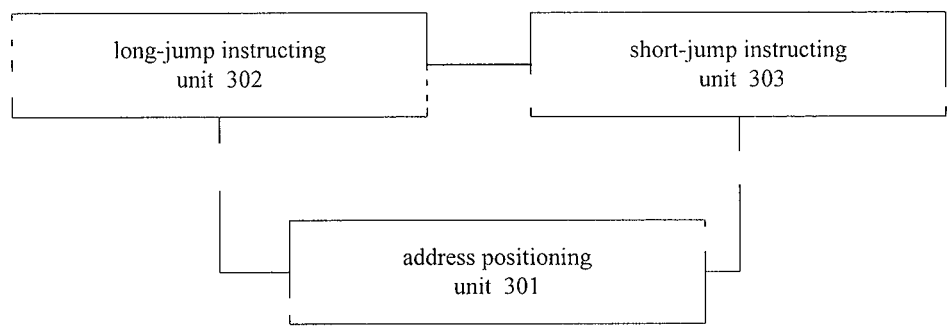
FIG. 13 is a schematic diagram illustrating the structure of a patch managing device according to the embodiments of the present invention.

Refer to FIG. 13, which is a schematic diagram illustrating the structure of a patch managing device according to the embodiments of the present invention. As should be explained, the patch managing device according to the embodiments of the present invention can be understood as the foregoing patch management thread, and the patch management thread involved in the embodiments of the present invention can be represented either in the form of a patch management program independent of various application programs, or a thread within a to-be-patched application program. As shown in FIG. 13, the patch managing device according to this embodiment includes:

an address positioning unit 301, configured to position, in the running process of a to-be-patched application program, an address of a patch function and an entry address of a to-be-patched function associated with the application program;

a long-jump instructing unit 302, configured to write, in a middle segment, a long-jump instruction for jumping to the patch function based on the address of the patch function and the entry address of the to-be-patched function, wherein the middle segment is a storage space, which is located before or after the entry position of the to-be-patched function and is capable of at least storing one long jump instruction; the storage space (middle segment) in this context can for instance be within 128 bytes before or after the entry position of the to-be-patched function (also referred to as "initial position of the function"), and can specifically be within six bytes before the entry position of the function; and a short-jump instructing unit 303, configured to modify the instruction at the entry position of the to-be-patched function to a short-jump instruction for jumping to the middle segment, so as to jump to the middle segment after the short-jump instruction is executed, and then to jump to and execute the patch function through instructions in the middle segment are executed.

To facilitate the subsequent description, the original instruction at the entry position of the to-be-patched function modified to the short-jump instruction is referred to as instruction A.

Under one implementation mode, instruction A is the first instruction at the entry position of the to-be-patched function and has a length greater than or equal to two bytes.

Under another implementation mode, instruction A is the non-first instruction at the entry position of the to-be-patched function and has a length greater than or equal to two bytes. Correspondingly, the long jump instructing unit 302 is specifically configured to write a reverse operating instruction to the operating instruction located before the modified instruction (namely instruction A) and a long-jump instruction for jumping to the patch function based on the address of the patch function and the entry address of the to-be-patched function, wherein the middle segment is a storage space, which is located before or after the entry position of the to-be-patched function and is capable of at least storing one long-jump instruction.

Correspondingly, the short-jump instructing unit 303 is specifically configured to modify a non-first instruction at the entry position of the to-be-patched function and with a length greater than or equal to two bytes to a short-jump instruction for jumping to the middle segment, so as to jump to the middle segment after the short-jump instruction is executed, and then to jump to and execute the patch function through that instructions in the middle segment are executed.

Specifically, the contents disclosed above relevant to the embodiments involving in the method for activating an on-line patch can be referred to for the specific operating processes of all units in this embodiment, while no repetition will be made here.

The embodiments of the present invention further provide a communication system, which comprises at least one processor core and a memory, the processor core has an operating system running thereon, the operating system has at least one application program running thereon, and the application program is associated with a patch management thread and at least one service thread, wherein:

the memory is loaded with an application program including at least one to-be-patched function and a patch file including a patch function, wherein a storage space capable of storing at least one long-jump instruction is located before or after the entry position of the to-be-patched function;

the patch management thread is configured, in the running process of the application program, to position the address of the patch function and the entry address of the to-be-patched function, to write, in the storage space, a long-jump instruction for jumping to the patch function, and to modify the instruction at the entry position of the to-be-patched function to a short-jump instruction for jumping to the storage space; and the service thread is configured to execute the short jump instruction to the entry position of the to-be-patched function, jumping to the storage space, and to jump to and execute the patch function through that instructions in the storage space are executed.

As should be explained, the processor involved in the embodiments of the present invention includes, but is not limited to, single-core processors or multi-core processors; correspondingly, the processor core mentioned in the embodiments of the present invention includes, but is not limited to, a CPU (central processing unit) core, a DSP (digital signal processor) core, and an MPU (micro processor unit) core.

In summary, the aforementioned embodiment of the present invention reserves the middle segment before or after the entry position of the function of the to-be-patched program, writes, in the reserved middle segment, the long-jump instruction for jumping to the patch function, modifies the instruction at the entry position of the to-be-patched function to a short jump instruction for jumping to the middle segment, and enables the patch to become effective by jumping through the middle segment while the patch is activated. Since the operation of modifying the instruction at the entry position of the function is an atomic operation, i.e. the lengths of the instruction prior to the modification and the modified instruction are identical, it suffices to modify only one instruction, and there is no need to cover other instructions in the critical segment, thereby avoiding the existing hidden troubles about the security and reliability in activating patches in the prior art under the multi-thread scheduling mechanism caused by the fact that, since the system makes use of a complicated set of instructions, the jump instruction will cover a plurality of instructions at the entry of the function when an on-line patch is activated for application software (i.e. a circumstance occurs in which threads are switched precisely when a certain thread is executed to the critical segment, if the on-line patch is activated at this time, abnormality will occur for the program after the thread is switched back, because the critical segment of the original function has been covered by the new jump instruction; or, an error will occur for the program when a thread returns after processing the signal processing function (the return address of the signal is in the critical segment), because the critical segment has already been covered by the jump instruction). Accordingly, the method according to the embodiments of the present invention can ensure the security and reliability in activating on-line patches of the software under the multi-thread condition, and does not interrupt the service.

It can be understood to the persons skilled in the art, the entire or partial flows of the methods of the aforementioned embodiments can be executed by a computer program instructing relevant hardware, and the program can be stored in a computer-readable storage medium and, when executed, can include the flows of the aforementioned embodiments for each method. The storage medium can be a magnetic disk, an optical disk, a read-only memory (ROM), or a random access memory (RAM), etc.

Preferred embodiments are taken for examples above to describe in detail the objectives, technical solutions and advantages of the present invention. As should be understood, the aforementioned embodiments are merely preferred embodiments of the present invention, rather than restrictive of the present invention, and any modification, equivalent replacement and improvement made within the spirit and principle of the present invention shall be covered by the protection scope of the present invention.

What is claimed is:

1. A method for activating an on-line patch, the method comprising:
    reserving, while a to-be-patched program is compiled, a middle segment adjacent an entry position of each function of one or more to-be-patched functions of the to-be-patched program;
    determining an address of a patch function and an entry address of the to-be-patched function;
    writing, in the middle segment, a long-jump instruction for jumping to the patch function based on the address of the patch function and the entry address of the to-be-patched function, wherein the middle segment is a storage space, which is located adjacent the entry position of the to-be-patched function and is capable of at least storing one long jump instruction, and the entry address of the to-be-patched function represents the entry position of the to-be-patched function; and modifying an instruction at the entry position of the to-be-patched function to a short-jump instruction for jumping to the middle segment, wherein the short-jump instruction at the entry position of the to-be-patched function is executed to jump to the middle segment, and then the long jump instruction for jumping to the patch function is executed to jump to the patch function and then the patch function is executed, wherein the middle segment includes one or more instructions, and the long jump instruction for jumping to the patch function is one of the one or more instructions;

wherein the process of reserving, while the to-be-patched program is compiled, the middle segment adjacent an entry position of each function of one or more to-be-patched functions of the to-be-patched program comprises:

after a source file of the to-be-patched program is compiled to generate an assembly file, searching for a keyword string representing a function in the assembly file, wherein the searched keyword string-is used for positioning the entry position of the function;

inserting an all-zero instruction with a specified number of bytes, adjacent to the entry position of the function positioned-by the searched keyword string, to reserve the middle segment, wherein the specified number of bytes represents the size of the middle segment; and when the all-zero instruction with the specified number of bytes has been inserted adjacent the entry position of each function of the one or more to-be-patched functions, recompiling the assembly file inserted with the all-zero instruction to generate a new assembly file, compiling the new assembly file to generate a target file, and linking a plurality of target files to generate an executable file of the to-be-patched program.

2. The method for activating an on-line patch according to claim 1, wherein the instruction modified to the short-jump instruction is a first instruction at the entry position of the to-be-patched function and with a length greater than or equal to two bytes.

3. The method for activating an on-line patch according to claim 1, wherein the instruction modified to the short-jump instruction is a non-first instruction at the entry position of the to-be-patched function and with a length greater than or equal to two bytes, the method further comprising: writing, in the middle segment, a reverse operating instruction to an operating instruction which is located before the modified instruction.

4. The method for activating an on-line patch according to claim 3, wherein the non-first instruction at the entry position of the to-be-patched function is an instruction after a Push onto Stack instruction, push; and that the reverse operating instruction to the operating instruction located before the modified instruction is a Pop from Stack instruction, pop.

5. A communication system, comprising at least one CPU, a memory and a compiler, the CPU having an operating system running thereon, the operating system having at least one application program running thereon, and the application program being associated with a patch management thread and at least one service thread, wherein the memory is loaded with a to-be-patched program including one or more to-be-patched functions and a patch file including a patch function, wherein there is a storage space capable of at least storing one long jump instruction adjacent an entry position of each function of the one or more to-be-patched functions;

the compiler is configured to reserve, while the to-be-patched program is compiled, a storage space capable of at least storing one long jump instruction adjacent an entry position of each function of the one or more to-be-patched functions;

the patch management thread is configured, in the running process of the application program, to determine an address of the patch function and an entry address of the to-be-patched function, to write, in the storage space, a long jump instruction for jumping to the patch function, and to modify an instruction at the entry position of the to-be-patched function to a short-jump instruction for jumping to the storage space, and the entry address of the to-be-patched function represents the entry position of the to-be-patched function; and the service thread is configured to execute to the short jump instruction at the entry position of the to-be-patched function to jump to the storage space, and then the long jump instruction for jumping to the patch function in the storage space is executed to jump to the patch function and then the patch function is executed, wherein the storage space includes one or more instructions, and the long jump instruction for jumping to the patch function is one of the one or more instructions;

wherein the compiler is specifically configured to search for a keyword string representing a function in an assembly file, after a source file of the to-be-patched program is compiled to generate the assembly file, wherein the searched keyword string is used for positioning the entry position of the function; to insert an all-zero instruction with a specified number of bytes, adjacent the entry position of the function positioned by the searched keyword string representing the function to reserve the storage space capable of at least storing one long jump instruction; and to recompile the assembly file inserted with the all-zero instruction to generate a new assembly file, when the all-zero instruction with the specified number of bytes has been inserted adjacent the entry position of each function of the one or more to-be-patched functions, to compile the new assembly file to generate a target file, and to link a plurality of target files to generate an executable file of the to-be-patched program, wherein the specified number of bytes represents the size of the storage space.

6. The communication system according to claim 5, wherein the patch management thread is configured, in the running process of the application program, to determine the address of the patch function and the entry address of the to-be-patched function, to write, in the storage space, the long-jump instruction for jumping to the patch function, and to modify the instruction at the entry position of the to-be-patched function and with a length greater than or equal to two bytes to the short-jump instruction for jumping to the storage space, if the instruction modified to the short-jump instruction is a first instruction at the entry position of the to-be-patched function and with a length greater than or equal to two bytes.

7. The communication system according to claim 5, wherein the patch management thread is configured, in the running process of the application program, to determine the address of the patch function and the entry address of the to-be-patched function, to write, in the storage space, a reverse operating instruction to an operating instruction located before the modified instruction and a long-jump instruction for jumping to the patch function and to modify the instruction at the entry position of the to-be-patched function and with a length greater than or equal to two bytes to the short-jump instruction for jumping to the storage space, if the instruction modified to the short-jump instruction is a non-first instruction at the entry position of the to-be-patched function and with a length greater than or equal to two bytes.

8. The communication system according to claim 5, wherein the patch management thread is configured, in the running process of the application program, to determine the address of the patch function and the entry address of the to-be-patched function, to write, in the storage space, a Pop from Stack instruction, pop and the long jump instruction for jumping to the patch function, and to modify an instruction after a Push onto Stack instruction, push at the entry position of the to-be-patched function to the short-jump instruction for jumping to the storage space.

9. A communication system, comprising at least one processor core, a memory and a compiler, the processor core having an operating system running thereon, the operating system having at least one application program running thereon, and the application program being associated with a patch management thread and at least one service thread, wherein
 the memory is loaded with a to-be-patched program including one or more to-be-patched functions and a patch file including a patch function, wherein there is a storage space capable of at least storing one long jump instruction adjacent an entry position of each function of the one or more to-be-patched functions;
 the compiler is configured to reserve, while the to-be-patched program is compiled, a storage space capable of at least storing one long jump instruction adjacent an entry position of each function of the one or more to-be-patched functions;
 the patch management thread is configured, in the running process of the application program, to determine an address of the patch function and an entry address of the to-be-patched function, to write, in the storage, a long-jump instruction for jumping to the patch function, and to modify an instruction at the entry position of the to-be-patched function to a short-jump instruction for jumping to the storage space, and the entry address of the to-be-patched function represents the entry position of the to-be-patched function; and
 the service thread is configured to execute the short-jump instruction at the entry position of the to-be-patched function to jump to the storage space, and then the long-jump instruction for jumping to the patch function in the storage space is executed to jump to the patch function and then the patch function is executed, wherein the storage space includes one or more instructions, and the long jump instruction for jumping to the patch function is one of the one or more instructions;
 wherein the compiler is specifically configured to search for a keyword string representing a function in an assembly file, after a source file of the to-be-patched program is compiled to generate the assembly file, wherein the searched keyword string is used for positioning the entry position of the function; to insert an all-zero instruction with a specified number of bytes, adjacent the entry position of the function positioned by the searched keyword string representing the function to reserve the storage space capable of at least storing one long jump instruction; and to recompile the assembly file inserted with the all-zero instruction to generate a new assembly file, when the all-zero instruction with the specified number of bytes has been inserted adjacent the entry position of each function of the one or more to-be-patched functions, to compile the new assembly file to generate a target file, and to link a plurality of target files to generate an executable file of the to-be-patched program, wherein the specified number of bytes represents the size of the storage space.

10. A method for activating an on-line patch, applied in a communication system, comprising at least one CPU, a memory and a compiler, the CPU having a Linux operating system running thereon, the Linux operating system having at least one application program running thereon, and the application program being associated with a patch management thread and at least one service thread, wherein the memory is loaded with a to-be-patched program including one or more to-be-patched functions and a patch file including a patch function, the method comprising:
 reserving, by a compiler, while the to-be-patched program is compiled, a middle segment adjacent an entry position of each function of the one or more to-be-patched functions;
 determining, by the patch management thread, an address of the patch function and an entry address of the to-be-patched function;
 writing, by the patch management thread, in the middle segment, a long jump instruction for jumping to the patch function based on the address of the patch function and the entry address of the to-be-patched function, wherein the middle segment is a storage space, which is located adjacent the entry position of the to-be-patched function and is capable of at least storing one long jump instruction, and the entry address of the to-be-patched function represents the entry position of the to-be-patched function; and
 modifying, by the patch management thread, an instruction at the entry position of the to-be-patched function to a short-jump instruction for jumping to the middle segment;
 executing, by the service thread, the short-jump instruction at the entry position of the to-be-patched function to jump to the middle segment, and then the long jump instruction for jumping to the patch function in the middle segment is executed to jump to the patch function and then the patch function is executed, wherein the middle segment includes one or more instructions, and the long jump instruction for jumping to the patch function is one of the one or more instructions;
 wherein the process of reserving, while the to-be-patched program is compiled, the middle segment adjacent an entry position of each function of the one or more to-be-patched functions comprises:
 searching for a keyword string representing a function in an assembly file, after a source file of the to-be-patched program is compiled to generate the assembly file, wherein the searched keyword string is used for positioning the entry position of the function;
 inserting an all-zero instruction with a specified number of bytes, adjacent the entry position of the function positioned-by the searched keyword string representing the function, to reserve the middle segment, wherein the specified number of bytes represents the size of the middle segment; and
 when the all-zero instruction with the specified number of bytes has been inserted adjacent the entry position of each function of the one or more to-be-patched functions, recompiling the assembly file inserted with the all-zero instruction to generate a new assembly file, compiling the new assembly file to generate a target file, and linking a plurality of target files to generate an executable file of the to-be-patched program.

* * * * *